J. N. SHAW.
COFFEE COOKER.
APPLICATION FILED OCT. 16, 1911.
1,022,337.
Patented Apr. 2, 1912.
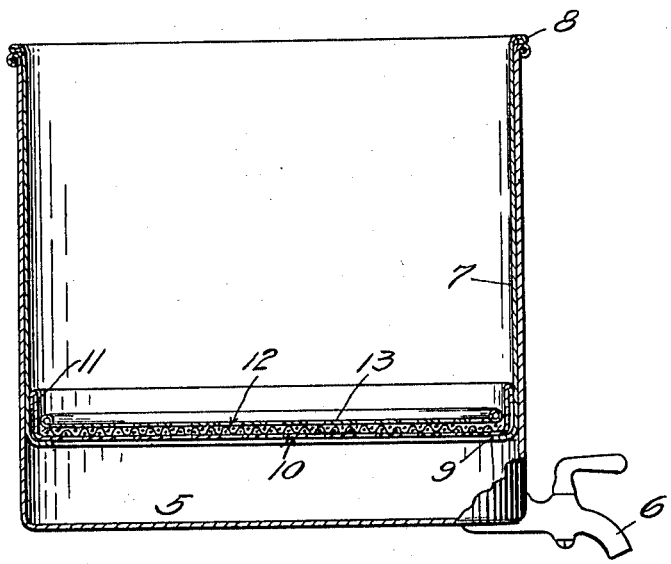
Fig. 1
Fig. 2
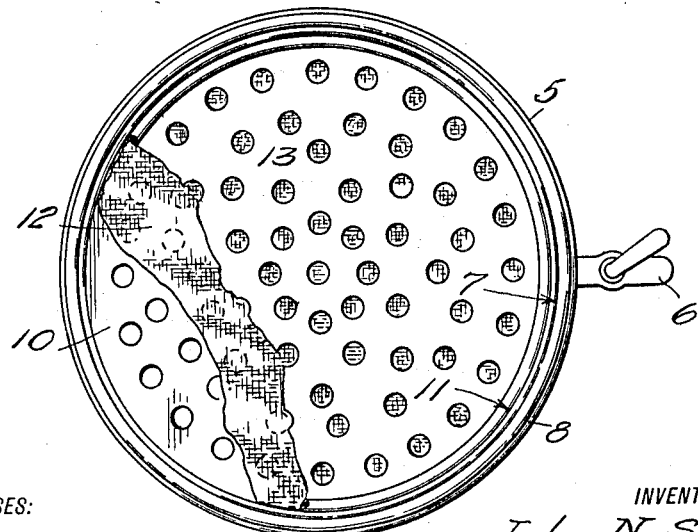
WITNESSES:
Horace Barnes,
F. C. Matheny
INVENTOR:
John N. Shaw
BY
Pierre Barnes
ATTORNEY

UNITED STATES PATENT OFFICE.

JOHN N. SHAW, OF SEATTLE, WASHINGTON.

COFFEE-COOKER.

1,022,337.  Specification of Letters Patent.  Patented Apr. 2, 1912.

Application filed October 16, 1911. Serial No. 654,856.

*To all whom it may concern:*

Be it known that I, JOHN N. SHAW, a citizen of the United States, residing at Seattle, in the county of King and State of Washington, have invented certain new and useful Improvements in Coffee-Cookers, of which the following is a specification.

This invention relates to cooking utensils and particularly to that class known as coffee percolators.

The object of the invention is the provision of means whereby the cooking of coffee is facilitated and its quality improved.

A further object is the provision of devices whereby the strainer cloth through which the coffee is percolated is rendered more serviceable than hitherto.

With these ends in view, the invention consists in the novel construction and combination of parts, as will be hereinafter described and claimed.

In the accompanying drawings, Figure 1 is a transverse vertical view of a cooker embodying my invention. Fig. 2 is a plan view thereof with portions broken away.

The reference numeral 5 designates an open top cylindrical vessel provided with a draw off faucet 6 at its lower end. Provided for said vessel is a removable liner comprising an imperforate cylindrical shell 7 of less depth than said vessel and is open at both its top and bottom ends. About its upper edge said shell is provided with means, such as an annular rib 8, adapted to rest on the rim of the vessel 5 to support the shell at a suitable height within the latter. Extending inwardly about the lower edge of said shell is a flange 9 which serves as a shelf for supporting a dish-shaped member comprising a perforated bottom 10 with an upwardly directed peripheral wall 11, having an outwardly turned top flange 20 and being of a proper diameter to fit within the shell 7 with the flange 20 engaging the inside thereof. Superposed upon the bottom 10 of said member is a strainer cloth 12. Above the latter is a second member 13 which is of a disk-shape, having an inturned peripheral bead 21 and with a perforated bottom and of a diameter to fit within the wall 11 of the other member.

The aforedescribed cooker is ordinarily employed within a casing or "urn," so called, which is provided with a detachable cover.

In operation, the parts of the cooker are disposed in the relative positions wherein they are illustrated in the drawings. Ground coffee is placed upon the member 13 and when boiling hot water is poured thereabove and the faucet 6 is open the water will percolate through the coffee in flowing from the compartment thereabove to the space below the bottom 10 of lower member.

The principal advantages of the present invention are due to the confinement of the strainer flat cloth between the two members and consequently the meshes of the cloth are not enlarged through stretching of the fibers, as would be the case where the cloth is hung as a bag or supported about the marginal edge only. It may also be mentioned that in the present construction, the only course for the water in passing from the upper compartment to the referred to lower space is necessarily through the layer of coffee grounds spread over the member 13, while in bag-shaped strainer cloths, the water passes most freely through the meshes of cloth above the level of the coffee grounds and whereby much of the strength of the concoction is unavailable.

What I claim as my invention, is—

In a coffee percolator, a cylindrical vessel, a shell adapted to closely fit therein with the outer surface of the shell contacting the inner surface of said vessel, an outturned top flange upon said shell adapted to seat upon the top of said vessel, an integral inturned flange upon the open bottom end of the shell, the latter being of a less height than the containing vessel, a dish-shaped member having an out-turned top flange and perforations through the bottom thereof adapted to fit within said shell with the flange contacting the inner surface and seated upon the bottom flange of the shell, a strainer cloth flatly engaging the bottom of and fitted within said member, a disk member having an inturned peripheral bead and having perforations through its bottom and adapted for reception within the dish-shaped member and flatly disposed upon said strainer cloth.

JOHN N. SHAW.

Witnesses:
HORACE BARNES,
E. PETERSON.

Copies of this patent may be obtained for five cents each, by addressing the "Commissioner of Patents, Washington, D. C."